(12) United States Patent
Ishii et al.

(10) Patent No.: US 6,824,271 B2
(45) Date of Patent: Nov. 30, 2004

(54) MULTIPROJECTION SYSTEM AND METHOD OF ACQUIRING CORRECTION DATA IN MULTIPROJECTION SYSTEM

(75) Inventors: Kensuke Ishii, Tokyo (JP); Takeyuki Ajito, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/764,416

(22) Filed: Jan. 23, 2004

(65) Prior Publication Data

US 2004/0150795 A1 Aug. 5, 2004

Related U.S. Application Data

(63) Continuation-in-part of application No. PCT/JP03/06738, filed on May 29, 2003.

(30) Foreign Application Priority Data

May 31, 2002 (JP) .......................... 2002-160475

(51) Int. Cl.[7] .................. G03B 21/00; G03B 21/14; H04N 9/12; H04N 9/31; H04N 3/22
(52) U.S. Cl. .................. 353/31; 353/69; 353/94; 353/121; 348/383; 348/744
(58) Field of Search .................. 353/31, 69, 94, 353/121; 348/383, 744, 745, 746, 747

(56) References Cited

U.S. PATENT DOCUMENTS 6,456,339 B1 * 9/2002 Surati et al. ................ 348/745
6,760,075 B2 * 7/2004 Mayer et al. ............... 348/383
2002/0041364 A1    4/2002 Ioka ............................ 353/69

FOREIGN PATENT DOCUMENTS

| JP | 2001-56517 A | 2/2001 | .......... G03B/33/12 |
| JP | 2001-249652 A | 9/2001 | .......... G09G/5/00 |
| JP | 2001-251646 A | 9/2001 | |
| JP | 2002-34908 A | 2/2002 | .......... A16B/1/04 |
| JP | 2002-72359 A | 3/2002 | .......... G03B/21/00 |
| JP | 2002-116500 A | 4/2002 | .......... G03B/2/00 |
| WO | PCT WO 02/07588 A1 | 1/2002 | .......... A16B/1/06 |

* cited by examiner

*Primary Examiner*—David Gray
*Assistant Examiner*—Melissa J Koval
(74) *Attorney, Agent, or Firm*—Frishauf, Holtz, Goodman & Chick, P.C.

(57) ABSTRACT

A multiprojection system that displays one color image by joining a plurality of color images projected by respective projectors is disclosed. The system includes an image capturing section including an optical section having a plurality of filter characteristics corresponding to a plurality of basic colors constituting the color image projected by the projectors, and capturing an image of each of the basic colors via the optical section; and a calculating section calculating offset correction data for each of the basic colors on the basis of a luminance distribution of offset light of each of the basic colors obtained by allowing the image capturing section to capture a black level image projected by the projectors.

10 Claims, 7 Drawing Sheets

MULTIPROJECTION SYSTEM AND METHOD OF ACQUIRING CORRECTION DATA IN MULTIPROJECTION SYSTEM

CROSS-REFERENCE TO RELATED APPLICATIONS

This is a Continuation Application of PCT Application No. PCT/JP03/06738, filed May 29, 2003, which was not published under PCT Article 21(2) in English.

This application is based upon and claims the benefit of priority from the prior Japanese Patent Application No. 2002-160475, filed May 31, 2002, the entire contents of which are incorporated herein by reference.

BACKGROUND OF THE INVENTION

1. Field of the Invention

The present invention relates to a multiprojection system that provides display using images projected by a plurality of projectors as well as a method of acquiring correction data in the multiprojection system.

2. Description of the Related Art

In a multiprojection system a plurality of projectors project images on a screen to obtain one image. Accordingly, measures must be taken to, for example, make the joints between the projected images unnoticeable. Thus, a calibration image is projected on the screen, and the projected image is captured using capturing means such as a digital camera. Then, various corrections are executed on the basis of image data obtained by the capturing (for example, refer to Jpn. Pat. Appln. KOKAI Publication No. 2002-72359 and Jpn. Pat. Appln. KOKAI Publication No. 2002-116500).

Even for a black level image in which R, G, and B signal levels are all zero, the projector outputs light having a specified luminance. Accordingly, the black level must be corrected (offset correction). However, in the prior art, the calibration image is captured without separating R, G, and B colors from one another. Thus, if a dark image is displayed, the colors may be nonuniform within each projector or between the projectors. This degrades display quality.

It is an object of the present invention to provide a multiprojection system that can improve display quality by reducing the color nonuniformity within each projector or between projectors, as well as a method of acquiring correction data in the multiprojection system.

BRIEF SUMMARY OF THE INVENTION

According to a first aspect of the present invention, there is provided a multiprojection system that displays one color image by joining a plurality of color images projected by respective projectors. The system includes an image capturing section including an optical section having a plurality of filter characteristics corresponding to a plurality of basic colors constituting the color image projected by the projectors, and capturing an image of each of the basic colors via the optical section; and a calculating section calculating offset correction data for each of the basic colors on the basis of a luminance distribution of offset light of each of the basic colors obtained by allowing the image capturing section to capture a black level image projected by the projectors.

The present invention may include following embodiments.

The multiprojection system further includes a correcting section correcting an image signal input to the projector using the offset correction data calculated by the calculating section.

Wavelength ranges of the filter characteristics do not overlap one another.

The optical section has a plurality of filters corresponding to the plurality of filter characteristics, and the plurality of filters can be switched by a mechanical operation.

The optical section has a tunable filter that can electrically set the plurality of filter characteristics.

The calculating section calculates the offset correction data for each of the basic colors so that an offset luminance level of each of the basic colors equals a maximum value of the luminance distribution of offset light of each of the basic colors all over a projection area of the plurality of projectors.

The multiprojection system further includes a section calculating a gamma characteristic distribution of each of the projectors on the basis of a luminance distribution of each image obtained by allowing the image capturing section to capture an image of each basic color at each signal level projected by the projector.

The optical section further has a filter characteristic that does not allow light of wavelength from 650 nm to a predetermined value to pass through.

According to a second aspect of the present invention, there is provided a method of acquiring correction data in a multiprojection system that displays one color image by joining a plurality of color images projected by respective projectors. The method includes: projecting a black level image from the projectors; separating the black level image into images of basic colors constituting the color image using an optical section having a plurality of filter characteristics corresponding to the basic colors; capturing each of the separated images of the basic colors; and calculating offset correction data for each of the basic colors on the basis of a luminance distribution of offset light of each of the basic colors obtained by capturing each of the separated images of the basic colors.

In this method, calculating the offset correction data may include calculating a gamma characteristic distribution of the projector.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the drawings.

Figure 1:
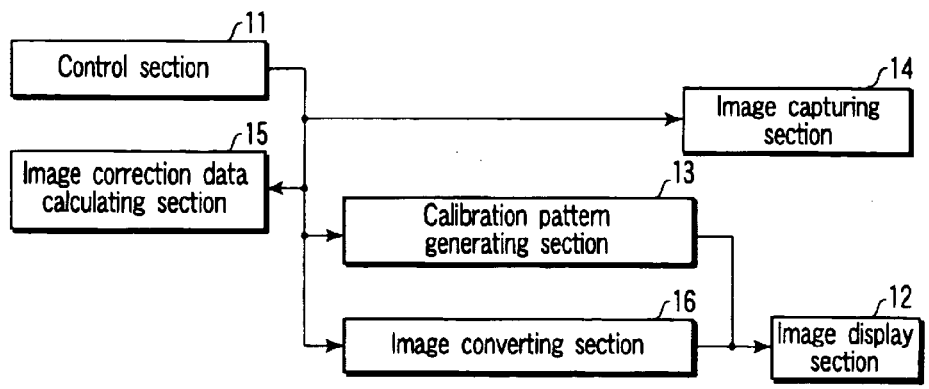
FIG. 1 is a block diagram showing the functional configuration of a multiprojection system according to an embodiment of the present invention.

FIG. 1 is a block diagram showing the functional configuration of a multiprojection system according to an embodiment of the present invention.

The basic configuration of the multiprojection system according to the present embodiment is similar to that of a general multiprojection system. The present multiprojection system comprises a control section 11 that controls the whole system, an image display section 12 that displays images to be projected on a screen, a calibration pattern generating section 13 that generates a calibration pattern (calibration image), an image capturing section 14 that captures the calibration pattern projected on the screen by the image display section 12, an image correction data calculating section 15 that calculates various image correction data on the basis of the captured calibration pattern, and an image converting section 16 that uses the calculated image correction data to correct input image data to generate output image data.

Figure 2:
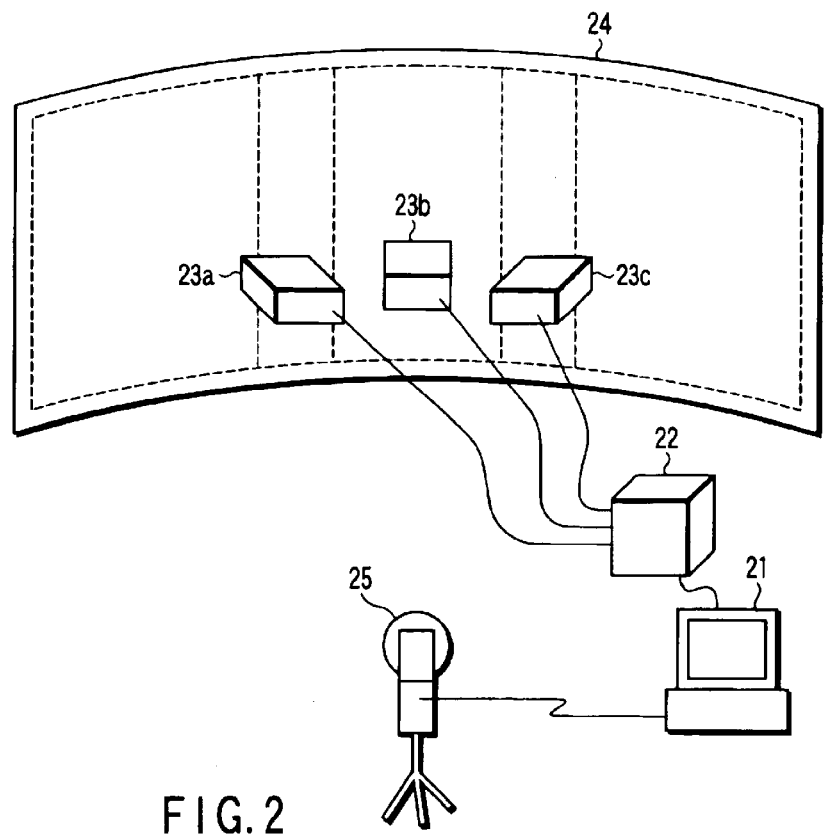
FIG. 2 is a view illustrating the specific configuration of the multiprojection system according to the embodiment of the present invention.

FIG. 2 is a view illustrating the specific configuration of the multiprojection system according to the embodiment of the present invention.

A personal computer (PC) 21 has the functions of the control section 11, calibration pattern generating section 13, and image correction data calculating section 15, shown in FIG. 1. The personal computer 21 controls the whole system and has a function of generating various calibration patterns and various arithmetic functions. An auxiliary apparatus 22 is connected to the personal computer 21. The auxiliary apparatus 22 has a part of the functions of the image converting section 16 and image display section 12, shown in FIG. 1.

Projectors 23a, 23b, and 23c correspond to the image display section 12, shown in FIG. 1. Images projected on an arch-type screen 24 by the projectors 23a, 23b, and 23c are synthesized into one image on a screen 24 so that joints are created between the images (the images overlap one another). In addition to normal images, the projectors 23a, 23b, and 23c project a calibration pattern on the screen 24 during calibration. In the example shown in the figure, the three projectors are arranged in a lateral direction. However, it is possible to change the number of projectors or the manner of arranging them.

A camera 25 corresponds to the image capturing section 14, shown in FIG. 1. The camera 25 captures a calibration pattern projected on the screen 24 from the projectors 23a, 23b, and 23c. The camera 25 may be, for example, a digital camera. Image data obtained by capturing is transmitted to the personal computer 21, which then calculates various image correction data.

Figure 3:
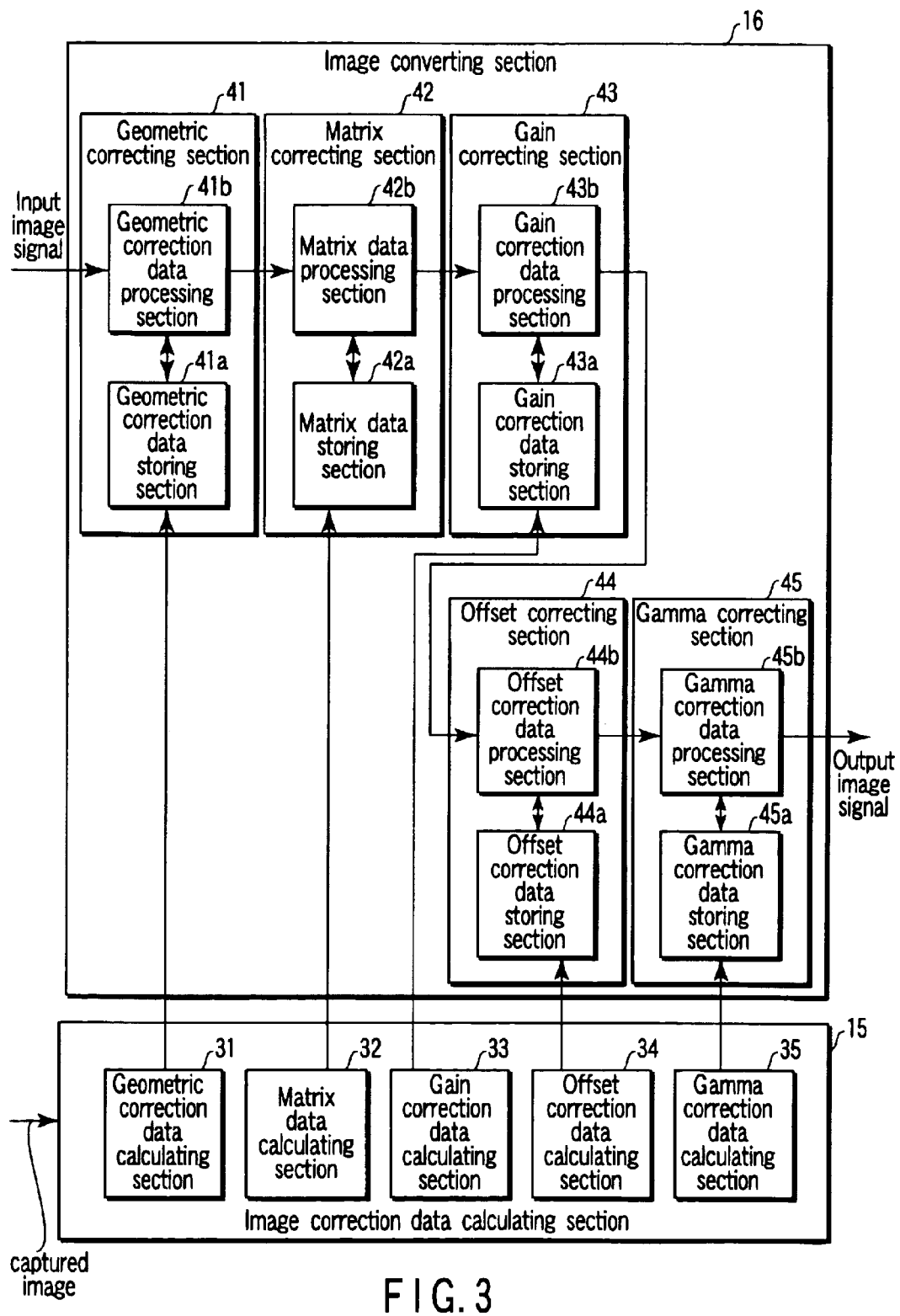
FIG. 3 is a block diagram showing the details of a part of the configuration of the multiprojection system shown in FIG. 1.

FIG. 3 is a block diagram showing the details of the image correction data calculating section 15 and image converting section 16, shown in FIG. 1.

The image correction data calculating section 15 comprises geometric correction data calculating section 31 that calculates data required to correct the positional relationship between images projected by the projectors, matrix data calculating section 32 that calculates data required to correct the colors of the images projected by the projectors, a gain correction data calculating section 33 that calculates data required to correct the gains (luminance) distribution of the image area projected by the projectors, an offset correction data calculating section 34 that calculates data required to correct the black level (offset level) distribution of the image area projected by the projectors, and a gamma correction data calculating section 35 that calculates data required to correct the gamma characteristic distribution of the image area projected by the projectors. The image correction data calculating section 15 calculates each correction data on the basis of image data on an image captured by the image capturing section (calibration camera) 14.

The image converting section 16 comprises a geometric correcting section 41, a matrix correcting section 42, a gain correcting section 43, an offset correcting section 44, and a gamma correcting section 45. The image converting section 16 uses correction data calculated by the image correction data calculating section 15 to execute correcting processes on input image data (an input image signal). The image converting section 16 then outputs the corrected image data as output image data (an output image signal).

That is, corrected data calculated by the geometric correction data calculating section 31, the matrix data calculating section 32, the gain correction data calculating section 33, the offset correction data calculating section 34, and the gamma correction data calculating section 35 are transmitted to a geometric correction data storing section 41a, a matrix data storing section 42a, a gain correction data storing section 43a, an offset correction data storing section 44a, and a gamma correction data storing section 45a, respectively. Then, using these correction data, the input image data is corrected by a geometric correction data processing section 41b, a matrix data processing section 42b, a gain correction data processing section 43b, an offset correction data processing section 44b, and a gamma correction data processing section 45b.

Figure 4:
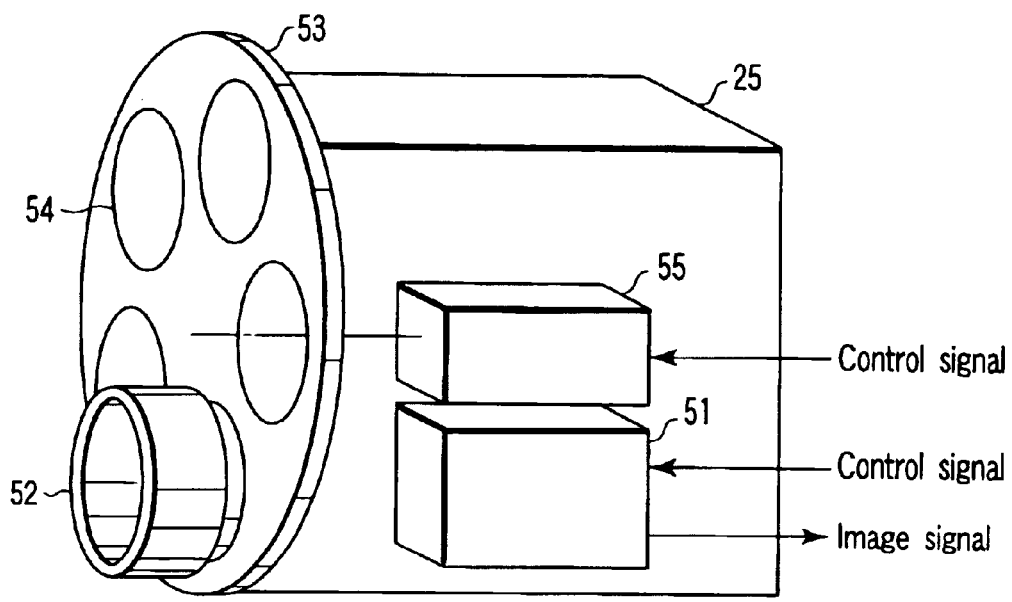
FIG. 4 is a view schematically showing an example of the calibration camera shown in FIG. 2.

FIG. 4 is a view schematically showing an example of the calibration camera 25, shown in FIG. 2.

The camera 25 comprises an imaging section 51 composed of a CCD or the like, a lens 52 that forms a captured image on the imaging section 51, a filter turret 53 provided with a plurality of filters 54 having predetermined characteristics, and a filter control section 55 that controls the filter turret 53 in accordance with a control signal from the personal computer 21, shown in FIG. 2, to place the desired filter 54 between the imaging section 51 and the lens 52.

Three of the plurality of filters 54 provided in the filter turret 53, are for red (R), green (G), and blue (B), which are the basic colors (primary colors) of color images projected by the projectors. These three filters 54 are used to correct color nonuniformity of offset light. In measuring gamma characteristics, R, G, and B components can be selectively acquired using the R, G, and B filters, respectively.

If the R, G, and B filters 54 can thus be switched, then when a black level image (offset image) is projected in which R, G, and B signal levels are all zero, the R, G, and B components of the offset light can be separately acquired. Consequently, by executing offset corrections using the R, G, and B data thus obtained, it is possible to reduce the color nonuniformity within each projector or between the projectors (the color nonuniformity of the offset light). This improves display quality.

The filter 54 may be a normal color filter or a bandpass filter that allows light of a narrow wavelength range to selectively pass through. In the example shown in FIG. 4, in addition to the R, G, and B filters, two other filters are provided. These two filters are used for geometric correction and white balancing, for example, and need not necessarily-be provided.

Figure 5:
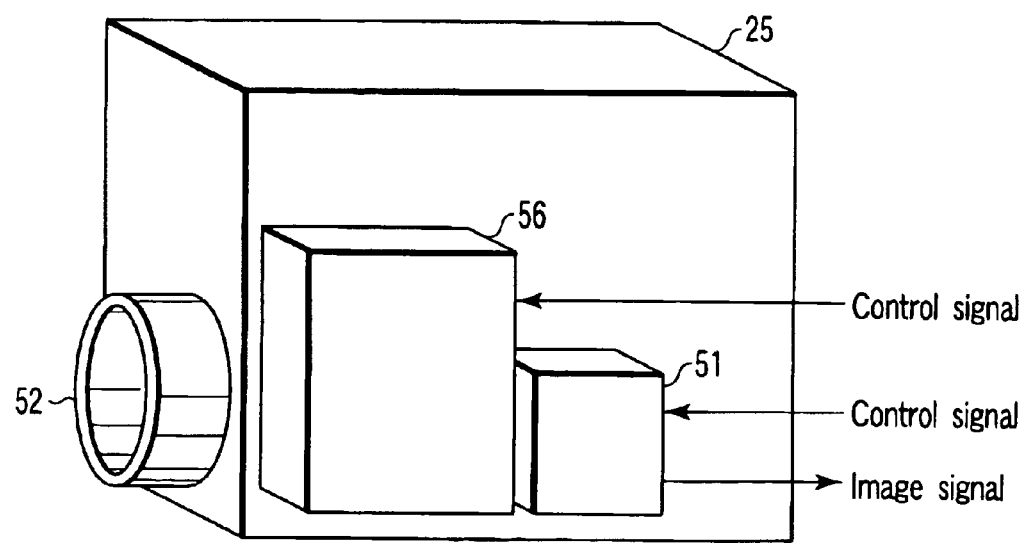
FIG. 5 is a view schematically showing another example of the calibration camera shown in FIG. 2.

FIG. 5 is a view schematically showing another example of the calibration camera 25, shown in FIG. 2.

In the example shown in FIG. 5, in place of the filter turret 53 shown in FIG. 4, the camera 25 is provided with a tunable filter 56 that can electrically change the wavelength range of transmitted light in accordance with a control signal from the personal computer 21, shown in FIG. 2. The tunable filter 56 may be, for example, a liquid crystal tunable filter. The use of the tunable filter 56 eliminates the need for the plurality of filters 54 such as those shown in FIG. 4. Consequently, the size of the camera 25 can be reduced.

Figure 6:
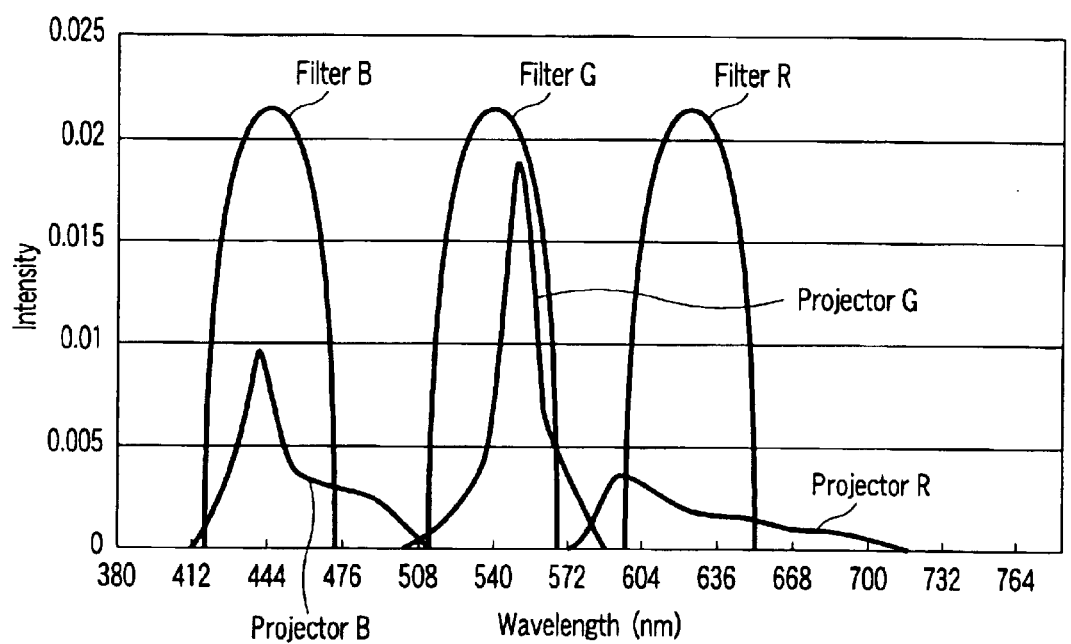
FIG. 6 is a graph showing an example of the spectrum characteristics of projectors and filters in the multiprojection system according to the embodiment of the present invention.

FIG. 6 is a graph showing the spectrum characteristics of the projectors and filters. The abscissa indicates wavelength, while the ordinate indicates intensity.

As shown in FIG. 6, the characteristics of the R, G, and B filters are set to correspond to the characteristics of the R, G, and B projectors, respectively. Furthermore, the characteristics of the R, G, and B filters are set so that their wavelength ranges do not overlap one another. Moreover, the characteristics of the R, G, and B filters are set so as not to contain any wavelength rages in which the characteristics of the R, G, and B projectors overlap one another. By using filters having such characteristics, it is possible to accurately acquire the R, G, and B components of the offset light.

In view of the S/N ratio of a signal to be measured, each filter preferably has such a characteristic as contains the emission line spectrum of a lamp provided in the corresponding projector. Furthermore, each filter preferably has such a characteristic as covers the wavelength range of the corresponding projector as wide as possible.

Figure 10:
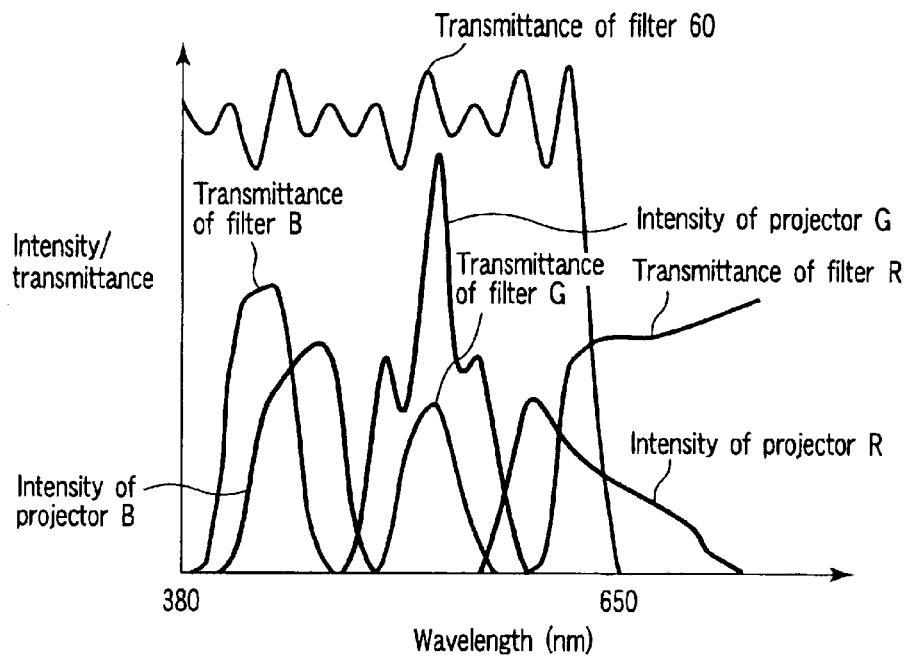
FIG. 10 is a graph showing another example of the spectrum characteristics of the projectors and filters in the multiprojection system according to the embodiment of the present invention.
Figure 11:
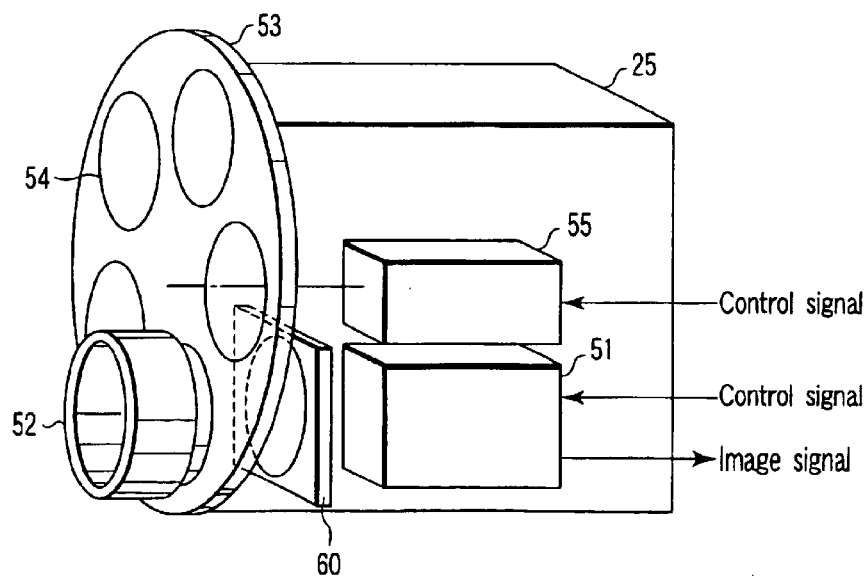
FIG. 11 is a view schematically showing another example of the calibration camera shown in FIG. 2.

Ideally, the R filter blocks light of wavelength 650 nm or more as shown in FIG. 6. However, many R filters allow light of wavelength 650 nm or more to pass through as shown in FIG. 10. In this case, projector light of wavelength 650 nm or more cannot be blocked, so that the R component of offset light may not be accurately acquired. This may reduce correction accuracy. In this case, it is desirable to provide another filter having such a characteristic as the one shown in FIG. 10. For example, as shown in FIG. 11, a structure may be employed in which a filter 60 blocking light of wavelength 650 nm or more can be set between the imaging section 51 and the filter turret 53. This structure enables the R component of offset light to be accurately acquired, thus preventing the correction accuracy from being degraded. The filter 60 has only to be able to block projector light of wavelength 650 nm or more and need not block all the light having a wavelength range of 650 nm or more. For example, the filter 60 has only to be able to block light of wavelength 650 to 780 nm.

Figure 7:
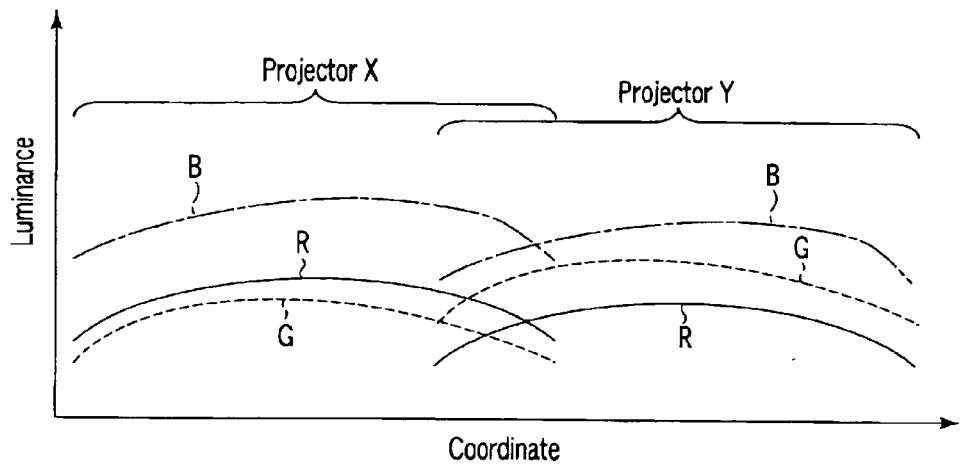
FIG. 7 is a graph showing the luminance distribution of offset light from the projectors according to the embodiment of the present invention.

FIG. 7 is a graph showing a luminance distribution obtained when an offset image in which the levels of R, G, and B signals input to the projectors are all zero is captured using the R, G, and B filters. The abscissa indicates the horizontal coordinate of an image projected by each projector. The ordinate indicates luminance. In the example shown in FIG. 7, for simplification of description, two (projectors X and Y) of the three projectors 23$a$, 23$b$, and 23$c$, shown in FIG. 2, are shown. As shown in FIG. 7, the luminance ration of R, G and B varies within each projector and between the projectors. This results in the color nonuniformity of offset light.

Figure 8:
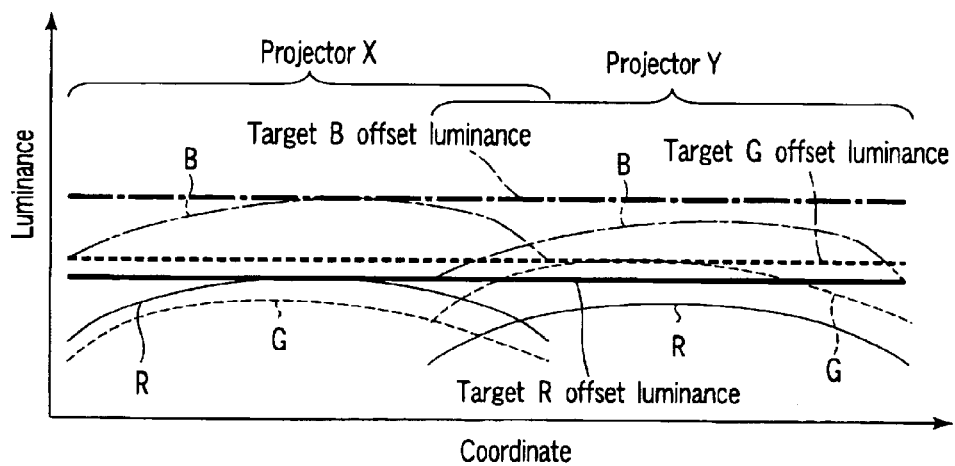
FIG. 8 is a graph showing the relationship between the luminance distribution of offset light and target offset luminance.

The present embodiment suppresses the color nonuniformity of offset light resulting from a difference in the luminance ratio of R, G and B as shown in FIG. 8. Specifically, the target offset luminance levels of R, G, and B are each adjusted so as to equal the maximum luminance level in the corresponding luminance distribution. Thus, the luminance ratio of R, G and B is equal all over the area of projection. This enables the suppression of the color nonuniformity of offset light within each projector and between the projectors.

Figure 9:
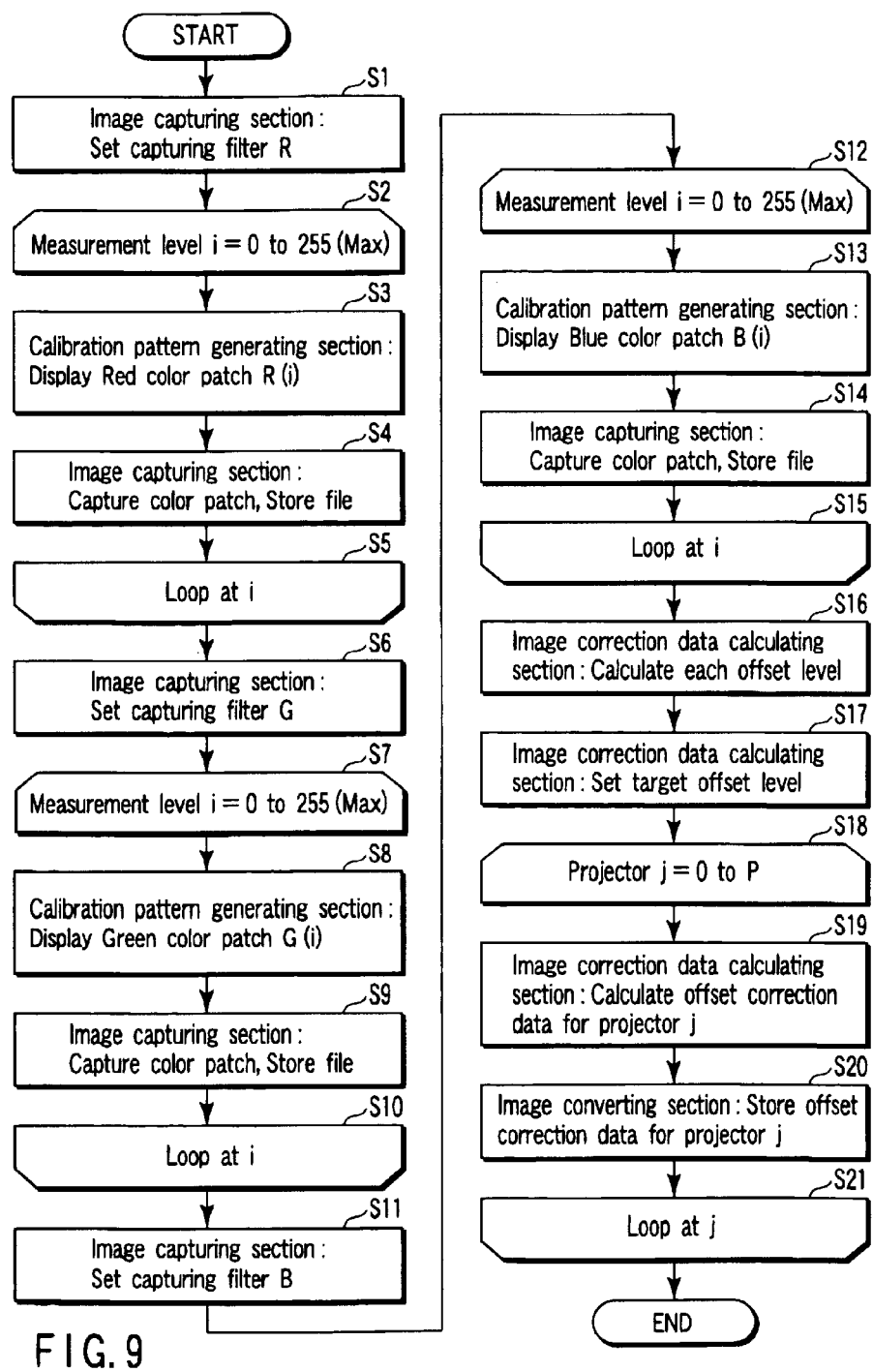
FIG. 9 is a flow chart showing operations of the multiprojection system according to the embodiment of the present invention.

Now, with reference to the flow chart shown in FIG. 9, description will be given of operations of the multiprojection system according to the present embodiment.

First, the filter R is set in the image capturing section (camera) 14 in FIG. 1 (S1). Subsequently, the measurement level i (the 0-th level to the 255-th level) of an input signal is set (S2). Subsequently, the calibration pattern generating section 13 is used to set a red color patch R (i). The image display section (projectors) 12 is then used to project a all-red image on the screen (S3). Moreover, the image capturing section 14 is used to capture the R color patch projected on the screen. Image data on the captured image is stored to a file (S4). Steps S2 to S4 are repeated with the measurement level i sequentially increased (S5). Thus, the gamma characteristic distribution of R is obtained.

Steps S3 and S4 may be repeatedly executed while incrementing the measurement level of the input signal by one from the 0-th level to the 255-th level. However, the measurement level may be increased in an arbitrary manner; the measurement may start with the 0-th level and may then be carried out at the 15-th level, then at the 31-st level, . . . However, the measurement must be carried at the minimum level (0-th level) and the maximum level (255-th level).

Then, filter G is set in the image capturing section 14 (S6). Then, as in the case with steps S2 to S5, steps S7 to S10 are executed for G to obtain the gamma characteristic distribution of G.

Then, filter B is set in the image capturing section 14 (S11). Then, as in the case with steps S2 to S5, steps S12 to S15 are executed for B to obtain the gamma characteristic distribution of B.

Then, on the basis of data obtained by the measurement of the 0-th level of the input signal, the image correction data calculating section 15 is used to calculate offset levels such as those shown in FIG. 7, for each of the R, G, and B colors and for each pixel (S16). Subsequently, on the basis of the calculated offset levels, target offset levels are set as described in FIG. 8 (S17).

Then, a projector number j (j=0 to P, corresponding to the number of projectors) is set (S18). Subsequently, the image correction data calculating section 15 is used to calculate offset correction data for the projector j and for each of the R, G, and B colors. For example, offset correction data is calculated which corresponds to the difference between the offset level of each pixel obtained in step S16 and the target offset level obtained in step S17 (S19). Moreover, the offset correction data on the projector j is stored to the image converting section (S20). Steps S18 to S20 are sequentially repeated for each projector j (j=0 to P).

In this manner, the gamma characteristic distribution of R, G, and B as well as the offset correction data on R, G, and B are obtained as described above.

Thus, in the present embodiment, the image capturing section (camera) is provided with R, G, and B filters corresponding to R, G, and B of the image display section (projectors). These filters are sequentially switched to obtain offset light data for each of R, G, and B. The acquired offset light data is then used to calculate offset correction data. It is thus possible to reduce the color nonuniformity (the color nonuniformity of offset light) within each projector and between the projectors.

In the above embodiment, as shown in FIG. 8, the target offset luminance levels of R, G, and B are adjusted so as to equal the maximum luminance level in R, G, and B luminance distribution. Accordingly, a black image may appear bright. In such a case, after calibration, ND filters having the same transmittance may be installed in the projectors. By thus installing the ND filters, the luminance of an image can be reduced to display a clear black. On the other hand, by installing the ND filters after calibration, it is possible to prevent the capturing from requiring too long a time during calibration.

According to the embodiment of the present invention, a multiprojection system can be provided which can reduce the color nonuniformity within each projector or between projectors and which provides a high display quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiprojection system that displays one color image by joining a plurality of color images projected by respective projectors, the system comprising:
    image capturing means comprising optical means having a plurality of filter characteristics corresponding to a plurality of basic colors constituting the color image projected by the projectors, and capturing an image of each of the basic colors via the optical means; and
    calculating means for calculating offset correction data for each of the basic colors on the basis of a luminance distribution of offset light of each of the basic colors obtained by allowing the image capturing means to capture a black level image projected by the projectors.

2. The multiprojection system according to claim 1, further comprising correcting means for correcting an image signal input to the projector using the offset correction data calculated by the calculating means.

3. The multiprojection system according to claim 1, wherein wavelength ranges of the filter characteristics do not overlap one another.

4. The multiprojection system according to claim 1, wherein the optical means has a plurality of filters corresponding to the plurality of filter characteristics, and the plurality of filters can be switched by a mechanical operation.

5. The multiprojection system according to claim 1, wherein the optical means has a tunable filter that can electrically set the plurality of filter characteristics.

6. The multiprojection system according to claim 1, wherein the calculating means calculates the offset correction data for each of the basic colors so that an offset luminance level of each of the basic colors equals a maximum value of the luminance distribution of offset light of each of the basic colors all over a projection area of the plurality of projectors.

7. The multiprojection system according to claim 1, further comprising means for calculating a gamma characteristic of each of the projectors on the basis of a luminance distribution of each image obtained by allowing the image capturing means to capture an image of each basic color at each signal level projected by the projector.

8. The multiprojection system according to claim 1, wherein the optical means further has a filter characteristic that does not allow light of wavelength from 650 nm to a predetermined value to pass through.

9. A method of acquiring correction data in a multiprojection system that displays one color image by joining a plurality of color images projected by respective projectors, the method comprising:
    projecting a black level image from the projectors;
    separating the black level image into images of basic colors constituting the color image using optical means having a plurality of filter characteristics corresponding to the basic colors;
    capturing each of the separated images of the basic colors; and
    calculating offset correction data for each of the basic colors on the basis of a luminance distribution of offset light of each of the basic colors obtained by capturing each of the separated images of the basic colors.

10. The method according to claim 9, wherein calculating the offset correction data includes calculating a gamma characteristic of the projector.

* * * * *

UNITED STATES PATENT AND TRADEMARK OFFICE
CERTIFICATE OF CORRECTION

PATENT NO. : 6,824,271 B2
DATED : November 30, 2004
INVENTOR(S) : Kensuke Ishii

It is certified that error appears in the above-identified patent and that said Letters Patent is hereby corrected as shown below:

Title page,
Item [63], Related U.S. Application Data, change "Continuation-in-part" to -- Continuation --.

Signed and Sealed this

Twenty-second Day of November, 2005

JON W. DUDAS
*Director of the United States Patent and Trademark Office*